United States Patent [19]

Tanner et al.

[11] Patent Number: 4,675,643
[45] Date of Patent: Jun. 23, 1987

[54] PRESSURE TRANSDUCER UTILIZING A TRANSDUCTION ELEMENT

[75] Inventors: René Tanner, Seuzach; Reto Calderara; Alfred Wenger, both of Winterthur; Hans-Conrad Sonderegger, Neftenbach, all of Switzerland

[73] Assignee: Kristal Instrumente AG, Winterthur, Switzerland

[21] Appl. No.: 645,262

[22] Filed: Aug. 29, 1984

[30] Foreign Application Priority Data

Nov. 10, 1983 [EP] European Pat. Off. ........ 83111227.1

[51] Int. Cl.⁴ .................................................. G01L 1/22
[52] U.S. Cl. ............................................. 338/4; 338/3
[58] Field of Search .......................... 338/2, 3, 4, 5, 42; 73/720, 721, 726, 727

[56] References Cited

U.S. PATENT DOCUMENTS 4,303,903 12/1981 Matsuoka et al. ................. 338/42 X
4,314,225 2/1982 Tominaga et al. ................ 338/42 X
4,527,428 7/1985 Shimada et al. ...................... 338/4 X

FOREIGN PATENT DOCUMENTS 2552393 8/1976 Fed. Rep. of Germany .
2938240 3/1980 Fed. Rep. of Germany .
0033749 8/1981 Fed. Rep. of Germany .
3009163A1 9/1981 Fed. Rep. of Germany .
2080541 2/1982 United Kingdom .

Primary Examiner—E. A. Goldberg
Assistant Examiner—M. M. Lateef
Attorney, Agent, or Firm—Birch, Stewart, Kolasch & Birch

[57] ABSTRACT

A piezoresistive transduction element for incorporation into a pressure transducer includes a plate defining a diaphragm zone and preferably of silicon with piezoresistances diffused into it, an insulating plate of a glass material and a base plate. The plates are preferably connected to each other by anodic connections in a series of steps. The base plate is made of a material having substantially the same coefficient of thermal expansion as that of the material of the plate which defines the diaphragm zone. Furthermore, the dimensions of the base plate are matched to those of the diaphragm plate. By these measures the deformation forces exerted by the base plate and diaphragm plate on the insulating plate upon changes in temperature are of substantially the same magnitude and therefore there is minimum bending of the diaphragm plate. A symmetrical transduction element is created which has minimum zero point displacement and minimum sensitivity changes in use. Pressure transducers equipped with such piezoresistive transduction elements are therefore appropriate for high measuring accuracy, particularly in combination with an improved, elastically extensible securement of a holder which carries the transduction element within the transducer housing.

17 Claims, 11 Drawing Figures

PRESSURE TRANSDUCER UTILIZING A TRANSDUCTION ELEMENT

BACKGROUND OF THE INVENTION

The invention relates to a transduction element and more particularly to a transduction element of a semiconductor material. The invention further relates to methods for the manufacture of the transduction element and to a pressure transducer incorporating the transduction element.

The development and use of piezoresistive pressure transducers based upon the use of a semiconductor material with for example diffused-in resistances has become of increasing significance in recent years, especially in the field of automation. The measuring element of such pressure transducers is a plate of preferably, monocrystal silicon arranged on an insulating substrate, such as glass, with an elastic diaphragm region provided on the crystal and which undergoes a bending movement under the effect of the pressure being measured. The resistances are secured to or diffused into the diaphragm region at the positions with the highest radial and tangential stresses, with the resistances being connected in a known manner to full or half measuring bridge networks.

Silicon as a monocrystal material has special mechanical properties in that it exhibits practically no creep or aging effects. Silicon is therefore an ideal semiconductor material for the formation of diaphragm plates, especially as it can be machined mechanically or chemically with high precision and has especially good electrical properties. The essential disadvantage of silicon is that it has a lower coefficient of thermal expansion by a factor of 4 to 6 than the steels which are conventionally used for the pressure transducer housing, especially the austenitic stainless steels. Therefore, temperature changes can easily lead to stresses and distortion of the silicon diaphragm plates secured to such steels, and this can lead for example to changes in the zero datum point.

The development work over the last few years has therefore concerned itself with these highly undesirable stress problems, and various measures have been proposed in order to at least partially avoid these disadvantages of piezoresistive pressure transducers based upon the use of silicon diaphragm plates. Thus, in EP-A1-0033749 it is proposed to secure the silicon diaphragm plate by means of a plastic or silicon rubber material in an elastically extensible and shearing manner to the metallic assembly plate of the sensor housing, so that the expansion differences between silicon and metal are absorbed elastically. However, this measure always results in reaction forces being exerted on the silicon diaphragm plate, so that it is only suitable for pressure sensors which have low demand requirements in terms of stability and constancy of the zero point. Moreover, plastic materials and especially silicon rubber exhibit a very high coefficient of thermal expansion and a pronounced hysteresis in relation to the stress/expansion ratio. Both these properties can cause additional errors in the pressure measurement.

From West German Patent Specification DE-A1-29 38 240 known there is known a piezoresistive pressure transducer based upon the use of a transduction element in which the silicon diaphragm plate is secured to an insulating glass plate by an anodic bonding, for which heating to the temperature range of 360° C. to 500° C. is necessary. Since glass has a higher coefficient of thermal expansion than silicon, the laminate of the two plates produces internal stresses, and consequently the silicon diaphragm plate is put laterally in the state of pressure stress. In extreme cases this can lead to the diaphragm going from a stable position to a "folded over" position (tin lid effect). Such an instability, even if the extreme case is not actually reached, changes the characteristics or calibration curve in the most undesirable way and is responsible for various deviations from linearity. The zero point in particular is strongly dependent on the temperature.

Finally, it is known from West German Patent Specification DE-A1-30 09 163 to provide a piezoresistive pressure transducer based upon the use of a silicon diaphragm plate which is secured by means of a thick soft solder layer to an assembly plate made of an iron-nickel alloy. Soft solder has a considerably higher coefficient of thermal expansion than silicon and therefore in the event of temperature changes likewise results in bending of the diaphragm plate. Such pressure transducers are therefore not suitable for precision measurements.

SUMMARY OF THE INVENTION

It is a main object of the invention to provide a piezoresistive transduction element of the type referred to above, in which temperature changes over a wide temperature range cause little or no residual bending of the measuring diaphragm.

A further object of the invention is to provide a transduction element, which can be manufactured in an economical manner with low cost and high precision.

A further object of the invention is to provide a transduction element of the type referred to above which has accuracy, sensitivity and zero point stability which are essentially independent of temperature.

A further object of the invention is to provide a method for the manufacture of a transduction element of the type referred to above, by which a plurality of transduction elements in an economical manner can be simultaneously produced by utilization of basic semiconductor technology.

A further object of the invention is to provide a pressure transducer having incorporated therein a transduction element of the type referred to above.

In accordance with one aspect of the present invention there is provided a transduction element comprising a plate defining at least one diaphragm zone and made of a semiconductor material with at least one piezoresistance, and an insulating plate to which the diaphragm plate is secured, wherein a base plate is secured to the surface of the insulating plate remote from the diaphragm plate, the base plate being of a material having an essentially equal or lower coefficient of thermal expansion than that of the insulating plate, and the thickness of the base plate being matched to that of the diaphragm plate so that the transduction element experiences minimum bending of the diaphragm plate when subject to temperature changes.

In accordance with another aspect of the present invention there is provided a transduction element comprising a plate defining at least one diaphragm zone and made of semiconductor material having at least one piezoresistance, and an insulating plate to which the diaphragm plate is secured, wherein a base plate is secured to the surface of the insulating plate remote from the diaphragm plate, the material and dimensions of the base plate being balanced in relation to the diaphragm plate so that with temperature changes the deformation forces exerted by the diaphragm plate and the base plate on the insulating plate are substantially equal, whereby the transduction element has a symmetrical stress status.

According to the invention the base plate which is secured to that surface of the insulating plate which is opposite the diaphragm plate can be balanced in terms of its material and configuration in relation to the diaphragm plate so that the deforming forces exerted by the two plates on the insulating plate in the event of temperature changes act in substantially the same sense. For example, if the coefficient of thermal expansion of the semiconductor material is smaller than that of the insulating material, then the coefficient of thermal expansion of the material of the base plate should likewise be smaller than that of the insulating material. The base plate can be connected anodically to the insulator or alternatively one can use a glass frit connection. Both methods require a heating of the components from 400° C. to 500° C. With a temperature change the effects of the forces of the two plates connected to the insulator are in the same sense and mutually supports each other. A glass plate which is connected on its one side to a silicon diaphragm plate and on its other side to a base plate which is also of silicon is prevented from a thermal contraction upon a cooling of both sides and the force effect of the glass plate on the diaphragm plate is smaller than if no base plate was present. The thermally caused force effect of the base plate on the glass plate results, in the cooling off process, in those stresses which continue through the glass plate and are retained, although weakening. By the choice of a relatively thick base plate of a material with a low expansion coefficient one can achieve a compensation of the thermal stressing of the silicon diaphragm. In practice, it is generally not necessary to seek for complete compensation. It is sufficient to flatten out the stress peaks so that consequently the expansion of the material remains within the elastic range governed by Hooke's law and no permanent deformation arises.

The transduction element in accordance with the invention has the advantage that temperature changes over a wide temperature range of at least 100° C. cause little or no change in the residual stress of the diaphragm portion of the transducer. The pressure transducer equipped with the transduction element in accordance with the invention is therefore characterised by high accuracy, and a sensitivity and zero point stability which is independent of temperature.

The base plate and the diaphragm plate can be made of the same or of different materials, so long as their coefficients of thermal expansion are essentially equal to that of the insulator or of the diaphragm plate. Silicon is a preferred material for the base plate and diaphragm plate, while the insulating plate is preferably made of a suitable glass material. This has the advantage among other things that the plates can be secured to one another by rigid anodic connections.

According to another preferred embodiment of the invention, the base plate can be secured to an intermediate support made of a metallic material, e.g. an iron-nickel alloy with a similar expansion coefficient. Thereby, the base plate effects an expansion equalisation between the insulating plate and the intermediate support, even if this should be made from a material with a higher expansion coefficient than that of the material of the insulating plate. The connection of the base plate to the mushroom-shaped intermediate support can be effected by an adhesive, a glass frit or by soldering. A solderable surface layer may be provided on the intermediate support. Transduction elements with such intermediate supports can therefore be soft soldered on to the assembly plate or holder of the pressure transducer very economically by the so-called batch method.

One particularly preferred method for the manufacture of a transduction element according to the invention comprises the steps of arranging an insulating plate-like substrate between a wafer of semiconductor material having a plurality of diaphragm zones each provided with at least one piezoresistance on the one hand and a base wafer on the other hand, connecting the substrate to the two wafers preferably in an anodic manner, and cutting the thus-formed laminate into individual units each with at least one diaphragm zone.

In this way one can simultaneously manufacture a plurality of transducer elements in an economically viable manner using the basic known methods of semiconductor technology which have been highly developed by experts in this art. The transduction element thereby produced can be secured in a further operational step, for example by glueing or by a glass frit, to an assembly plate or holder of the pressure transducer. By the term "glass frit" is meant the application of a glass powder to the surfaces to be connected together and the subsequent melting of the glass.

An alternative to the aforementioned process is provided if one connects a wafer of semiconductor material having a plurality of diaphragm zones each provided with at least one piezoresistance only to an insulating substrate, preferably in an anodic manner, and then cuts the thus formed two-layer laminate into individual units each having at least one diaphragm zone. After the cutting operation the base plate is secured by a separate manufacturing step to the two-layer laminate.

This method has the advantage that the creation of the anodic connection between the diaphragm wafer and the insulating substrate which is, as a rule, transparent, permits easy visual monitoring of the process. The securement of the base plate to the insulating plate follows preferably simultaneously in one and the same heat treatment process together with the securement of the base plate to the holder of the sensor or to a mushroom-shaped intermediate support. Preferably, the base plate is connected to the insulating plate and to the holder by a glass frit, although it would alternatively be possible to use an adhesive connection.

A pressure transducer using a transduction element of the aforementioned type is characterised by the fact that the transducer element is mounted either directly or by way of an intermediate support on a plate-like holder which is welded into the sensor housing. As an alternative to this welding connection one could use the known methods of glueing, soldering or a glass frit.

In order to keep the effects of temperature stresses between the holder of the transduction element and the transducer housing as small as possible, the holder should preferably be connected to the transducer housing in an elastically expansible way. A particularly advantageous embodiment of the invention is characterised by the fact that the holder is connected to the transducer housing by way of a tubular holder portion which is elastically expansible. The holder in this case has a substantially U-shaped cross-section. Because of this not only are the thermal expansions of the transducer housing absorbed elastically, but there is also the further advantage that the sensitive glass inlets, by means of which the electrical leads which take out the measurement signals are secured into the holder, can be arranged sufficiently far away from the location at which the tubular holder portion is welded on to the transducer housing. This avoids damaging local overheating of these glass inlets.

The tubular elastic holder portion can be arranged to extend on the same side of the holder as the transducer element is positioned. In this case the fitting of the holder with the transducer element located thereon is effected from below into the sensor housing. Before the fitting of the holder, a sealing diaphragm provided on the housing can be fitted to enclose a pressure transmission medium and can be tested for correct functioning.

The elastic tubular holder portion can alternatively be arranged to project to the side of the holder remote from the transducer element. This opens up the possibility of letting the pressure transmission medium act laterally on the holder and on its tubular portion, so that the electrical leads which are glazed into the holder are exposed to a lateral pressure. By this means, particularly at high measuring pressures, one avoids the electrical leads being forced out of their glazed inlets.

Other objects of the present invention will become apparent from the detailed description giving hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
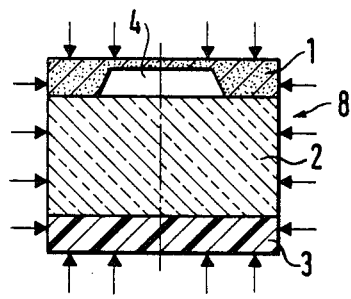
FIG. 1 is a sectional view through a transduction element constructed in accordance with the invention, with an indication of the forces exerted by the pressure to be measured.

In the drawings the same or similar elements are denoted by the same reference numbers in the various Figures. The terms "upper" and "lower" refer to the orientation of the components as shown in the drawings.

In FIG. 1 there is shown, indicated generally by the reference numeral 8, a force-symmetrical and expansion-compensated transduction element in accordance with the invention which comprises an upper diaphragm plate 1, a lower base plate 3 and an intermediate insulating plate 2. The diaphragm plate 1 is made of a semiconductor material, preferably silicon, and is provided in the underside of its central region with a recess 4 which thins the wall thickness of the plate 1 to form a diaphragm in this region. The diaphragm plate 1 includes piezoresistances which, in accordance with known methods of semiconductor technology, can be diffused into the plate or secured to it.

The diaphragm plate 1 is secured to the insulating plate 2 at its thicker-walled circumferential region. The insulating plate 2 should be made of a material with a suitable coefficient of thermal expansion in relation to the diaphragm plate 1 so that a good connection with the diaphragm plate 1 is able to be achieved. Suitable materials for the insulating plate 2 are for example glass materials, preferably boron/silicate glasses, whose coefficient of thermal expansion is lower than that of other glasses but which is still higher than that of silicon.

The base plate 3 can be made essentially of any suitable material which has an equally low or lower coefficient of thermal expansion than the material of the diaphragm plate 1. Silicon has proved to be a suitable material for the base plate 3.

The connection of the plates 1, 2 and 3 together can be effected by methods known in semiconductor technology. Anodic connection is especially preferred because of its high strength and rigidity. The anodic connection technique is known to persons skilled in this art and therefore does not need to be described in more detail herein.

Figure 2:
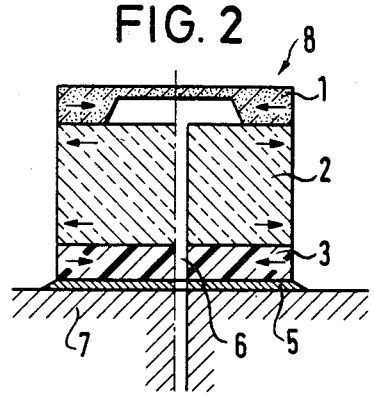
FIG. 2 shows fragmentary partial views of transduction elements similar to FIG. 1 for absolute pressure measurements (left-hand half of the drawing) and relative pressure measurements (right-hand half of the drawing) and the securement of the transducer elements to appropriately formed assembly plates or holders and with the deformation forces also being indicated.

In one preferred embodiment of the invention the base plate 3 is balanced in relation to the diaphragm plate 1 so that with temperature changes the forces arising in the transduction element act approximately symmetrically, as indicated in FIG. 2. This means that the surface expansion forces in particular, which act between the diaphragm plate 1 and the insulating plate 2 on the one hand and between the base plate 3 and the insulating plate 2 on the other hand, are substantially equal and give rise to minimum stress peaks on account of the uniform shear stress distribution on the two sides of the glass plate. Moreover, no distortion of the transduction element occurs, and especially of its diaphragm plate. This is achieved by virtue of the aforementioned choice of the materials used for the diaphragm plate 1 and for the base plate 3 which have substantially equal coefficients of thermal expansion, and furthermore by virtue of the fact that the configuration and dimensions, i.e. especially the thickness, of the base plate 3 in relation to the diaphragm plate 1 are balanced so that the surface expansion forces arising in the two plates 1 and 3 substantially compensate each other. As a result, one has a transducer element which is not deformed, or is only immaterially deformed, with changes in temperature, i.e. it maintains its original shape.

The left-hand half of FIG. 2 shows a transduction element 8 of the type shown in FIG. 1 for absolute pressure measurements, while the right-hand half of FIG. 2 shows a transduction element designed for relative pressure measurements. For this latter purpose the base plate 3 and the insulating plate 2 are penetrated by a through bore 6 which issues into the recess 4 in the diaphragm plate 1. The recess 4, and consequently the underside of the diaphragm zone of the diaphragm plate 1, can therefore be subjected to pressure. The bore 6 can be made in the transduction element in any suitable manner, for example by ultrasonic radiation.

FIG. 2 also shows how the transducer element 8 is secured to a support or holder 7 by means of an intermediate layer 5. A preferred method of securing the transducer element 8 to the holder 7 is the so-called glass frit method in which powdered glass is spread upon the surfaces which are to be connected and is then melted. This technique is known to those skilled in this art and need not therefore be described in more detail. A simpler alternative method is to use an adhesive.

Figure 3:
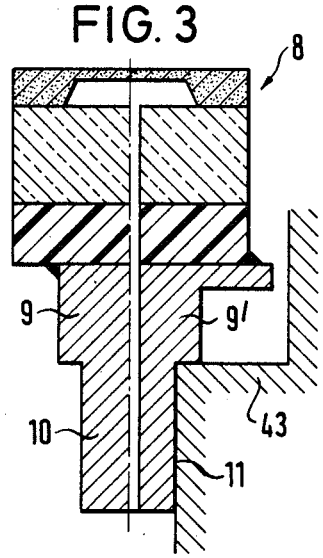
FIG. 3 shows fragmentary partial views of transducer elements similar to FIG. 2 for absolute and relative pressure measurement, in combination with appropriately formed intermediate supports, wherein the base plate is made substantially thicker than the diaphragm plate.

FIG. 3 shows a transduction element for absolute pressure measurements or relative pressure measurements (left-hand and right-hand halves respectively of the drawing), in which the base plate 3 is made thicker and is secured in a suitable manner, for example by means of an epoxy resin, by a glass frit or by soldering, to a metallic intermediate support 9,9' which is T-shaped in cross-section or is mushroom-shaped. The intermediate support 9,9' is preferably made of a material which with temperature changes behaves similarly to the material of which the insulating plate 2 is made. However, even with distinctly different coefficients of thermal expansion of the materials for the intermediate support 9 and the insulating plate 2, the base plate 3 of the transduction element functions as an equalising component in such a manner that the formation of cracks in the insulating plate 2 is avoided. This danger would be present if the insulating plate 2 was to be fixed directly on to the metallic intermediate support 9,9', since all types of glass permit only very small tensile stresses.

As is illustrated, it can be advantageous for the base plate 3 to be made thicker than the diaphragm plate 1. For certain temperature ranges, smaller stress peaks in the diaphragm plate 1 can be achieved by an unsymmetrical distribution of the forces.

The intermediate support 9,9', which in the case of a transducer element for relative pressure measurements likewise is traversed by a through bore aligned with and joined with the through bore 6, may be provided with a solderable surface layer 11 on its shaft portion 10. This opens up the possibility for example, with the socalled batch method of manufacture, of simultaneously soldering a plurality of intermediate supports 9,9' with transduction elements 8 secured thereto on to a corresponding plurality of holders 7.

There is now described with reference to FIGS. 4, 5, 6 and 7 preferred methods for manufacturing the transduction elements according to the invention. Basically, use is made of methods of semiconductor techniques, as are described for example in U.S. Patent Specification No. 3764950.

Figure 4:
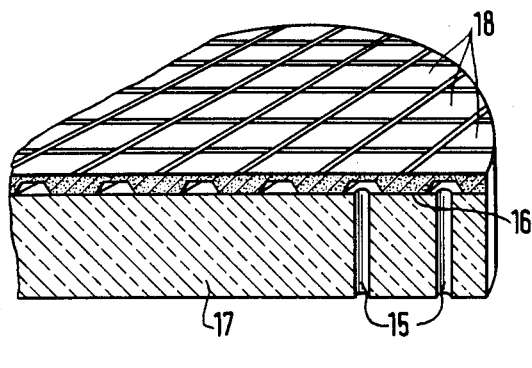
FIG. 4 is a perspective partial sectional view of a laminate comprising a diaphragm wafer and an insulating substrate.

As is shown in FIG. 4, a so-called wafer 18 of a semiconductor material, such as silicon, suitable for the formation of the diaphragm plate 1 is mounted on an insulating plate-like substrate 17 of for example a suitable glass material by means of an anodic connection 16. The wafer is, as shown, divided into a number of units which each have dimensions and a configuration corresponding to the diaphragm plate 1 of a transduction element to be produced.

For the creation of transduction elements for relative pressure measurements, the plate-like substrate 17 can be bored through, as is indicated at 15.

Figure 5:
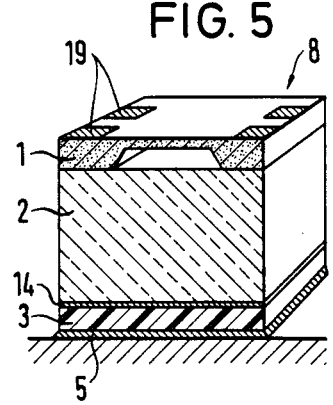
FIG. 5 is a perspective sectional view of a transduction element cut from the laminate shown in FIG. 4 and with a base plate secured thereto.

The two-layer laminate shown in FIG. 4 has the advantage that the connecting zone 16 between the wafer 18 and the insulating substrate 17, which is preferably a glass plate, can easily be examined optically. One can therefore immediately ascertain the zones where a perfect connection of the two plates has been made. From the two-layer laminate shown in FIG. 4, individual units each corresponding to one transduction element with a diaphragm plate 1 and an insulating plate 2, as shown in FIG. 5, are cut, for example by means of a diamond saw. On each unit formed in this way a prefabricated base plate 3, such as has already been described in connection with FIG. 1, is then secured, for example by a glass frit connection 14.

It is alternatively possible to secure the base plate 3 to the insulating plate 2 and to the holder 7 of the transducer simultaneously in one and the same heat treatment operation, as is indicated in FIG. 5 by the intermediate layer 5, which can likewise be a glass frit connection. The reference numeral 19 indicates electrical terminal zones on the diaphragm plate 1 by means of which the electrical signals of the resistances can be taken off.

Figure 6:
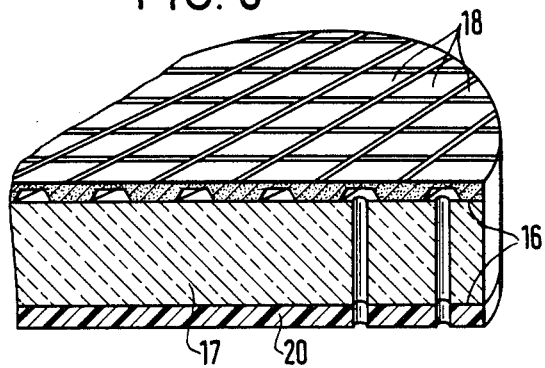
FIG. 6 is a perspective partial sectional view of a laminate consisting of a diaphragm wafer, a base wafer and a substrate sandwiched between them.
Figure 7:
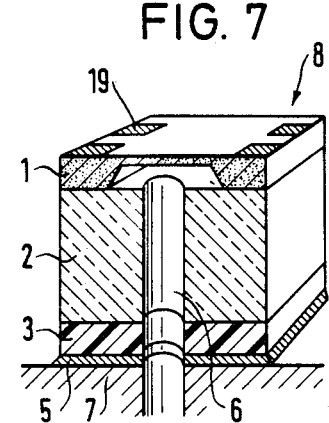
FIG. 7 is a perspective sectional view of a single transduction element for relative pressure measurement cut from the laminate shown in FIG. 6.

The method shown in FIG. 6 differs from the method shown in FIG. 5 in that on the face of the insulating substrate 17 opposite to the face which carries the wafer 18 there is mounted a further wafer 20 from which the base plate 3 is formed. The wafers 18 and 20 are connected to the insulating substrate 17 preferably by anodic connections 16. A transduction element cut from the three-layer laminate according to FIG. 6 is shown in FIG. 7 and corresponds to the element which has been described above in connection with FIGS. 1 and 2. The transduction element can be secured to the holder 7 of the transducer by means of an intermediate layer 5, for example a glass frit connection, or it can be secured alternatively with an adhesive.

Figure 8:
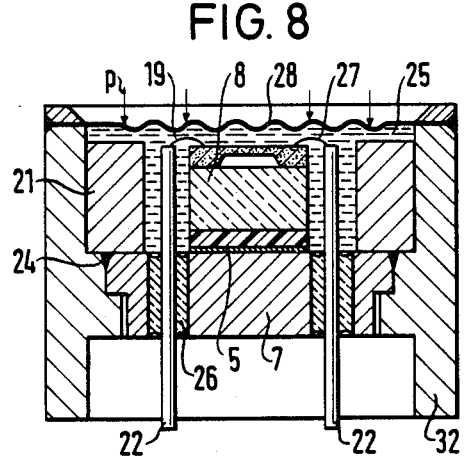
FIG. 8 is a sectional view through a first embodiment of pressure sensor in accordance with the invention and incorporating a transduction element according to the invention; and, FIGS. 9 to 11 are sectional views through preferred embodiments of pressure transducer in accordance with the invention and incorporating transduction elements according to the invention.

FIG. 8 shows a pressure transducer with a symmetrical transduction element 8 of the type shown in FIG. 1. The transduction element 8 is secured or glued by way of an intermediate layer 5 directly on to the plate-like holder of the transducer. The holder 7 has bores into which electrical leads 22 are cast in glass eyes 26. The electrical leads 22 are connected to the terminal zones 19 of the resistances on the diaphragm plate 1 by wires 27 of gold or aluminium.

The holder 7 rests, as shown, on an annular support surface on an intermediate step of the transducer housing 32 and is hermetically sealed to the transducer housing by means of a circumferential welded seam 24. The pressure forces acting on the transduction element 8 are transmitted by way of a pressure transmission medium 25, preferably a silicon oil. The pressure transmission medium 25 substantially fills the space defined within the housing 32 above the holder 7. This space, as shown, is sealed at the top by a resilient metallic membrane 28 secured to the housing 32. In order to keep the volume of this space and the amount of pressure transmission medium 25 which fills it as small as possible, a ring 21 of a ceramic material is inserted into the housing. The holder 7 is made of a non-stainless steel with a coefficient of thermal expansion which is smaller than the coefficient of thermal expansion of the austenitic steels preferably used for the housings of pressure transducers, on account of the better machining properties of the former steel and the need to provide the necessary through bores for the electrical leads 22. With temperature changes, because of the different coefficients of thermal expansion between the holder and the housing of the pressure transducer, stress can therefore occur which has a disadvantageous effect on the accuracy of measurement and on the reproducibility of measurements. In order to prevent this, in the preferred pressure transducer according to the invention shown in FIGS. 9 to 11, the holder carrying the transduction element is connected to the transducer housing 33 by means of a tubular elastic holder part 30.

This elastically extensible connection means that thermal stresses have a substantially smaller effect on the intermediate layer between holder and transduction element than is the case with the simple plate-like holder used in the embodiment shown in FIG. 8. The elastically extensible connection thus offers a further important aid towards the creation of piezoresistive pressure transducers for precision measurement in which the measuring accuracy is substantially unaffected by temperature changes.

Figure 9:
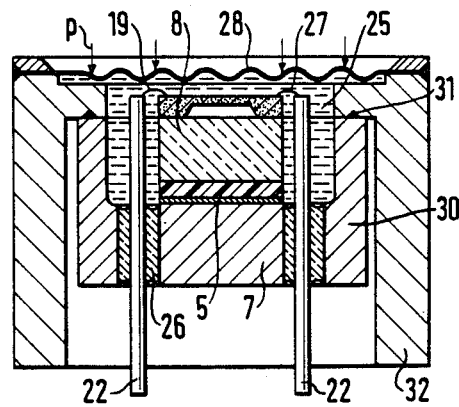

In the pressure transducer shown in FIG. 9 the tubular elastically expansible holder part 30 projects to the same side of the holder 7 as the transduction element 8 is positioned and at its free upper face, as is indicated at 31, is welded to a horizontal support surface on the transducer housing 33 by means of a butt weld. In other respects the transducer shown in FIG. 9 corresponds to the transducer shown in FIG. 8, so that further reference to the other parts of the device need not be made. The transducer shown in FIG. 9 has the advantage that the combination of the holder 7 and the transduction element 8 can be inserted into the housing 33 from below, after the diaphragm 28 has been secured to the housing. The securement and formation of the diaphragm 28 can therefore be examined for correctness before the holder 7 with the transduction element 8 is secured to the housing 33 by way of the tubular holder part 30.

Figure 10:
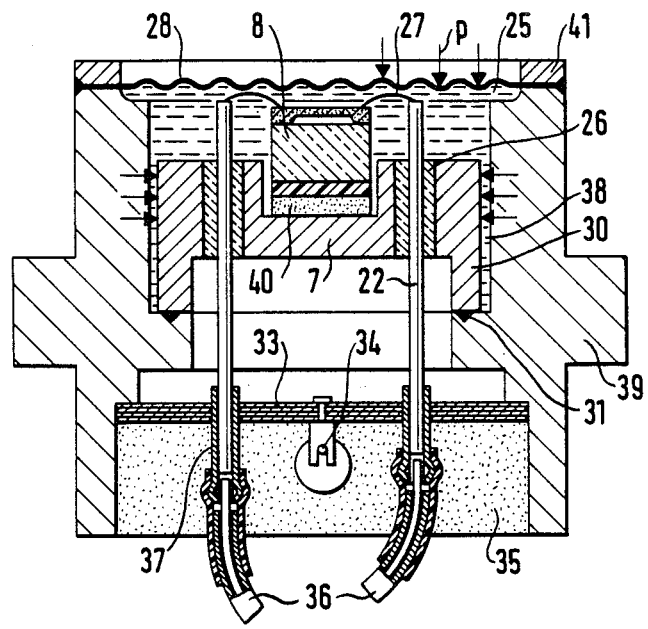

FIG. 10 shows a pressure transducer having a holder 7 which is provided in its upper face with a recess into which the transduction element 8 is secured, for example by a layer 40 of epoxy resin on the base of the transduction element. From the underside of the holder 7 remote from the transduction element 8 there projects the tubular elastically expansible holder part 30 which is butt welded at its free end at 31 to a support surface on the sensor housing 39. Since the tubular holder part 30 here extends away from the diaphragm 28, the arrangement of the holder 7 with the transduction element 8 secured thereon must first be secured to the housing 39 before the diaphragm 28 can be mounted in place. Because of this assembly from the diaphragm side there is created the possibility of allowing the pressure transmission medium 25 also to act in an annular chamber 38 between the holder and the inner circumferential face of the housing 39 and thus radially with respect to the holder 7. The electrical leads 22 do not therefore become unsealed or become dislodged from the glass eyes 26 even under a high pressure of the transmission medium. The pressure transducer shown in FIG. 10 is therefore suitable especially for high pressure measurements.

As shown, a plate 33 with compensating resistances 34 can also be secured to a lower region of the sensor housing 39. The electrical leads 22 are guided through the plate 33 by way of sliding sleeves 37. Braided conductors 36 for the electrical leads 22 serve to take away the signals. The plate 33, the resistances 34 and the electrical leads 22 can be embedded in a mass 35 of plastics material which is introduced into the lower region of the housing 39 as shown.

Figure 11:
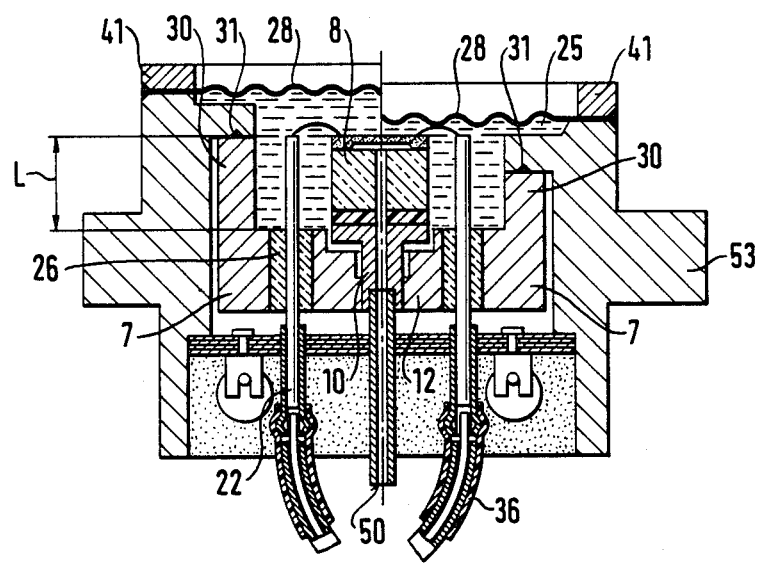

FIG. 11 shows a pressure transducer for relative pressure measurements using an arrangement of transduction element and intermediate support as is shown in the righthand half of FIG. 3 of the drawings. The symmetrical transduction element 8, as has already been described in connection with FIG. 3, is secured to the T-shaped intermediate support which for its part has its shaft portion 10 soldered into a hole in the holder 7. Instead of using a soldered connection one can alternatively use a cement connection.

As in the embodiment shown in FIG. 9, the holder 7 with the elastic tubular holder part 30 and the soldered-on combination of intermediate support and transduction element is inserted from below into the transducer housing 53, whereafter the free upper face of the tubular holder part 30 is butt welded to an annular support surface on the sensor housing 53, as is indicated at 31. The pressure path to the underside of the diaphragm plate of the transduction element 8 necessary for relative pressure measurements is provided by means of a tube 50 which is secured to the shaft portion 10 of the intermediate support and which extends out downwardly from the transducer. The length L of the tubular elastic holder part 30 can be chosen according to particular circumstances, so that one always ensures that the glass eyes 26 holding the electrical leads 22 do not become overheated by the welding at the zone 31 and simultaneously the tubular elastic holder part 30 can exert the desired expansion equalising effect. In other respects the transducer shown in FIG. 11 corresponds substantially to the construction of transducer shown in FIG. 9, and in relation to the components provided in the lower part of the transducer housing one can incorporate the components 33 to 37 of the embodiment shown in FIG. 10.

A fact common to all the pressure transducers shown in FIGS. 9 to 11 is that they have an extraordinary stability and zero datum constancy because of the combination of a symmetrical and therefore distortion-free transduction element with a bending-free connection of the holder to the transducer housing by the use of a tubular elastically extensible holder part. They therefore represent precision pressure transducers. These pressure transducers can nevertheless be manufactured economically thanks to the highly developed semiconductor techniques in connection with the known batch processes.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transduction element comprising a diaphram plate defining at least one diaphragm zone and made of semiconductor material having at least one piezoresistance, an insulating plate to which said diaphragm plate is secured, and a base plate secured to the surface of the insulating plate remote from the diaphragm plate, the material and dimensions of said base plate being balanced in relation to the diaphragm plate so that with temperature changes the deformation forces exerted by the diaphragm plate and the base plate on the insulating plate are substantially equal, said materials of the base plate and diaphragm plate having substantially equal coefficients of thermal expansion, whereby the transduction element has a symmetrical stress status.

2. A transduction element as claimed in claim 1, wherein the base plate and the diaphragm plate are made of the same material.

3. A transduction element as claimed in claim 1, wherein the base plate and the diaphragm plate are made of different materials.

4. A transduction element as claimed in claim 2, wherein the diaphragm plate and the base plate are made of silicon material, especially from monocrystal silicon.

5. A transduction element as claimed in claim 3, wherein the diaphragm plate is made of silicon material, especially from monocrystal silicon.

6. A transduction element as claimed in claim 1, wherein the insulating plate is made of a glass material.

7. A transduction element as claimed in claim 1, wherein there is an anodic connection between the diaphragm plate and the insulating plate and a glass frit connection between the insulating plate and the base plate.

8. A transduction element as claimed in claim 1, wherein there is an anodic connection between the diaphragm plate and the insulating plate and simultaneously applied glass frit connections between the insulating plate and the base plate and between the base plate and an intermediate support.

9. A transduction element as claimed in claim 1, having anodic connections between the diaphragm plate, the insulating plate and the base plate.

10. A transduction element as claimed in claim 1, including an intermediate support which is secured to the base plate and is made of a material having substantially the same coefficient of thermal expansion as the insulating plate.

11. A transduction element as claimed in claim 1, adapted for relative pressure measurements, having at least one hole extending through the base plate and the insulating plate in the direction towards the diaphragm zone of the diaphragm plate.

12. A pressure transducer incorporating a transduction element, comprising a plate defining at least one diaphragm zone and made of semiconductor material having at least one piezoresistance, an insulating plate to which the diaphragm plate is secured, and a base plate secured to the surface of the insulating plate remote from the diaphragm plate, the material and dimensions of said base plate being balanced in relation to the diaphragm plate so that with temperature changes the deformation forces exerted by the diaphragm plate and the base plate on the insulating plate are substantially equal, whereby the transduction element has a symmetrical stress status, said transduction element being secured directly, or by means of an intermediate support secured to the base plate, onto a holder arranged in the transducer housing.

13. A pressure transducer as claimed in claim 12, in which the holder is substantially plate-like and connected in an elastically extensible manner to the transducer housing.

14. A pressure transducer as claimed in claim 13, in which the holder is connected to the transducer housing by means of a tubular holder portion.

15. A pressure transducer as claimed in claim 14, in which the tubular holder portion extends from the same side of the holder as the transduction element.

16. A pressure transducer as claimed in claim 13, in which the tubular holder portion extends from the side of the holder opposite to that at which the transducer element is located.

17. A pressure transducer as claimed in claim 13, in which a pressure transmission medium is hermetically sealed into the transducer by a diaphragm for pressure loading of the transduction element.

* * * * *